United States Patent [19]

Ho

[11] Patent Number: 4,996,410
[45] Date of Patent: Feb. 26, 1991

[54] DUAL PURPOSE CHAFING POT

[76] Inventor: Chung-Kuo Ho, 6th Floor, No. 137-6, Yu Hsi St., Yungho, Taipei Hsien, Taiwan

[21] Appl. No.: 485,912

[22] Filed: Feb. 27, 1990

[51] Int. Cl.⁵ .............................................. F27D 11/00
[52] U.S. Cl. .................................... 219/432; 219/433; 219/438
[58] Field of Search ............... 219/432, 433, 429, 434, 219/436, 438, 456, 441, 442

[56] References Cited

U.S. PATENT DOCUMENTS

| | | | |
|---|---|---|---|
| 1,650,999 | 11/1927 | Preston | 219/433 |
| 2,686,250 | 8/1954 | Schroeder | 219/433 |
| 2,847,552 | 8/1958 | Gates | 219/434 |
| 4,165,456 | 8/1979 | Dogliotti | 219/434 |

FOREIGN PATENT DOCUMENTS

| | | | |
|---|---|---|---|
| 670318 | 11/1933 | Fed. Rep. of Germany | 219/433 |
| 301617 | 12/1928 | United Kingdom | 219/433 |

Primary Examiner—Teresa J. Walberg
Attorney, Agent, or Firm—Lowe, Price, LeBlanc, Becker & Shur

[57] ABSTRACT

An electric chafing pot having two heating coils positioned to heat different parts of a pan for containing food. A base unit providing the heating coils is configured with a roughly cylindrical convex structure in the center of the base unit, having one heating coil mounted at the top of the convex structure and another heating coil provided around the bottom of the convex structure. The pan is concavely shaped to closely fit over the convex structure and to contact the heating coils at two different surfaces. The result is an efficiently heated dual function electric chafing pot.

4 Claims, 3 Drawing Sheets

FIG. IA
PRIOR ART

DUAL PURPOSE CHAFING POT

TECHNICAL FIELD

The present invention relates to a structural improvement of an electric chafing pot, and particularly to an electric chafing pot in which the base of the pot body has upper and lower heating plates.

BACKGROUND ART

People have attached such a high importance to food that the variety of serving and cooking techniques is enormous, and these are constantly changing. Better food and devices for food preparation are desirable. Most kitchenware is required to meet safety and sanitation standards. Kitchenware must be durable and capable of multiple functions. Thus, kitchenware manufacturers bear a heavy burden to fulfill all these expectations.

To the majority of people, a "chafing pot" as shown in FIG. 1A is not uncommon. Chafing pots are quite popular for entertaining groups of people. Chafing pots are also popular in cafeterias since chafing pots facilitate easy serving of crowds with a variety of different food. A chafing pot is desireable because one can cook his favorite raw foods in the pot filled with boiling water for long or short time periods depending upon the property of individual food and personal preferences. Also, unlike fried dishes, use of a chafing pot provides for a leisurely cooking period particularly important in social situations. Also, many foods are enhanced by this type of cooking process.

Food can be cooked in a conventional chafing pot. However, due to the fact that the pot body is formed in an arc or deep concave sphere, only foods and soup on the bottom of the pot can be well heated. Further, because different kinds of food have different heat conduction properties, one might wait for a long time to eat. To avoid the aforesaid defects, the electric heater is enlarged to provide greater heating capability. However, the power cord and switch can become so overloaded as to cause sparks and a burning smell. One could hardly have food under these conditions. Thus, consumers often complain about a high incidence of malfunction and risk occasioned by electric chafing pots.

DISCLOSURE OF THE INVENTION

An object of the invention is to overcome the above-mentioned defects. Unlike conventional mechanisms this invention has mounted a second set of electric coils to provide a heat source for a ring plate formed from a concavity in the middle of the pan. A convex structure with an upper plate is formed on the base of the pot to match the ring plate formed in the middle of the pan, whereby the chafing pot can be used for the dual purpose of grilled and liquid immersed cooking simultaneously. This not only enables proper heating of various foods but also offers a plane surface on the top of the ring plate to grill food. Therefore, a second object of this invention is to provide a dual-purpose electric chafing pot convenient for people to use.

Another object of this invention is to provide two sources of heat different from the one heat source design of the prior art. This new design not only fully utilizes heat energy but also prolongs the life span of the products.

The present invention will become more readily apparent from the following descriptions when taken in conjunction with the accompanying drawings in which a preferred embodiment of this invention are shown.

BRIEF DESCRIPTION OF THE DRAWINGS

FIG. 1A is a diagramatic view showing a conventional chafing pot.

DETAILED DESCRIPTION OF PREFERRED EMBODIMENTS

Figure 1B:
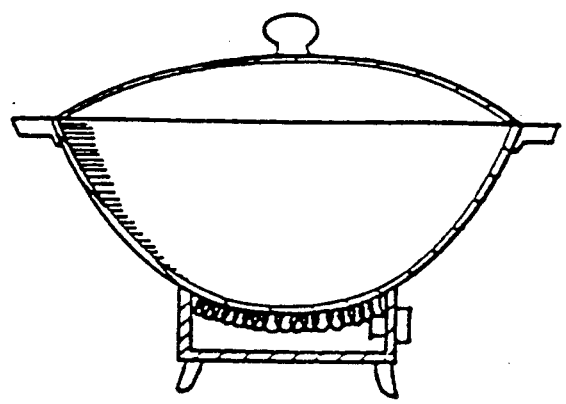
FIG. 1B is a perspective view showing the appearance of this invention.
Figure 1B:
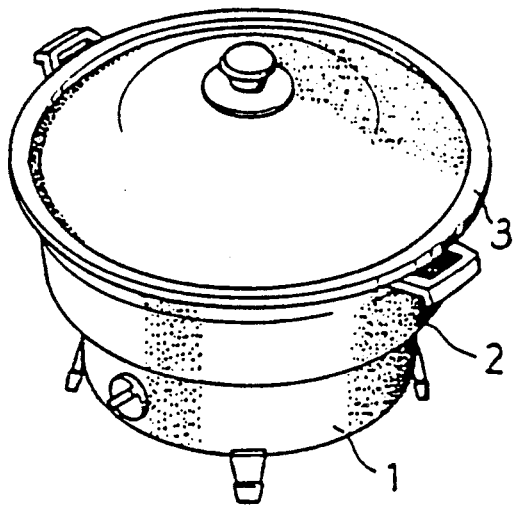

Referring to FIG. 1B, it can be understood that this invention comprises a thermal chafing pot body 1, a pan 2 and a pan lid 3.

Figure 2:
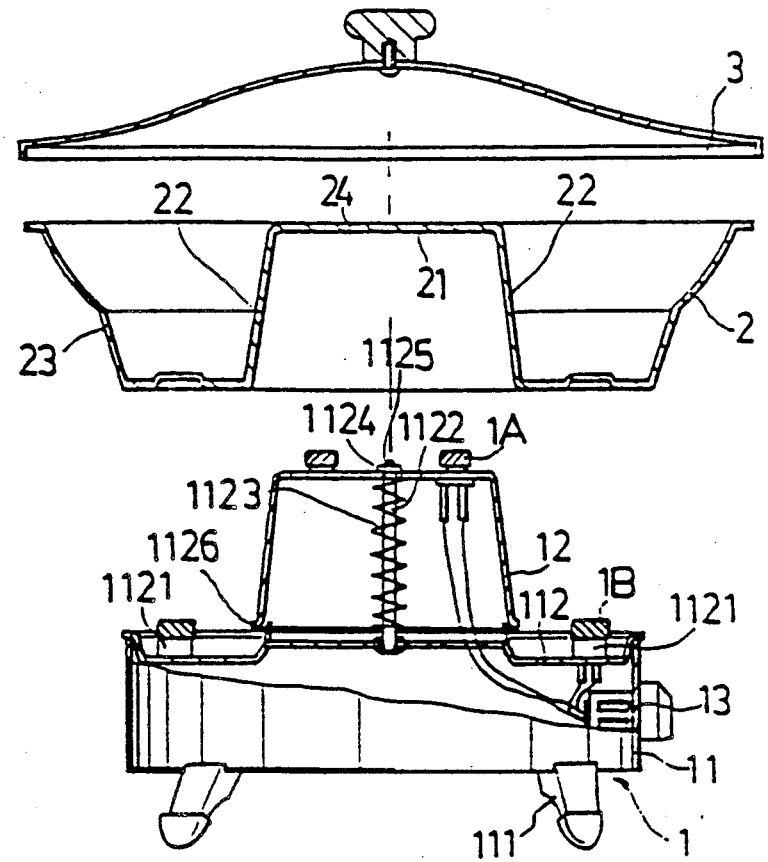
FIG. 2 is a vertical and sectional view of this invention.
Figure 3:
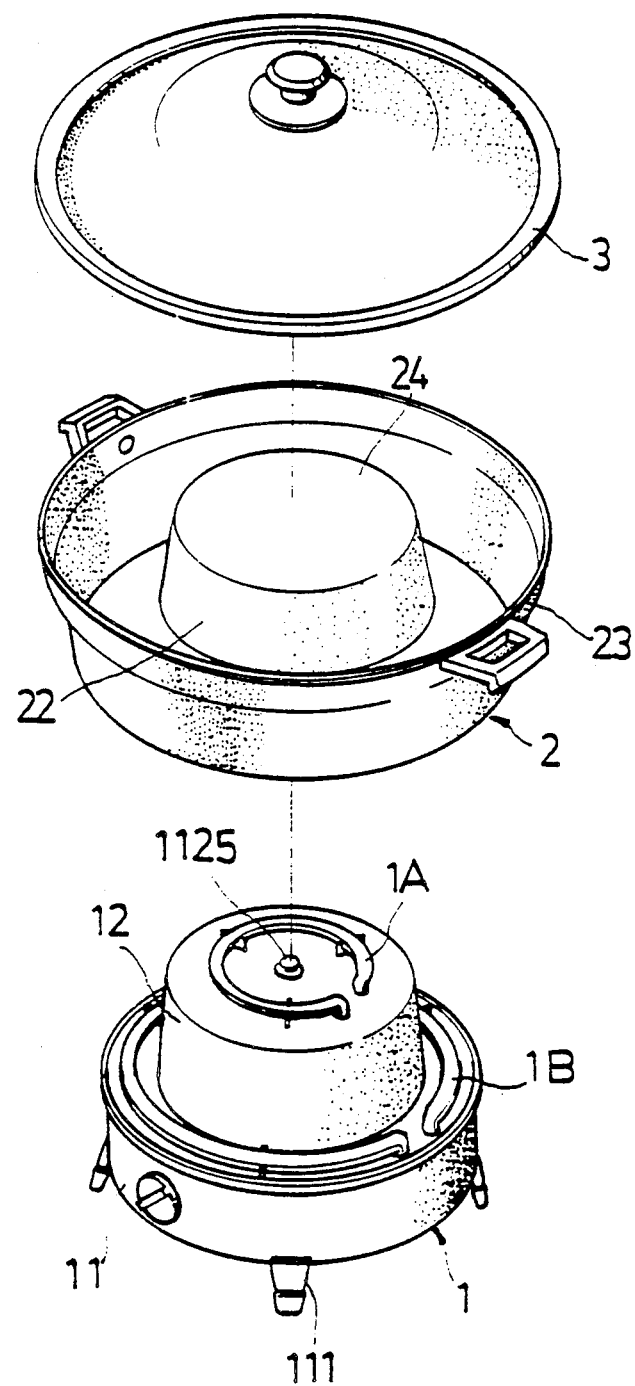
FIG. 3 is a perspective view showing the components of this invention.

Referring to FIG. 2 and FIG. 3, the thermal chafing pot body 1 is divided into upper plate 12 and lower plate 11, the lower plate 11 is supported by foot rack 111 and provided with a thermal switch 13 to control thermal coil 1A and 1B, a convex ring plate 112 is protected by the top end of the lower plate 11 to form a space to prevent the ring plate surface from getting very hot. This avoids damage to a supporting table top by heat. The thermal coil 1B comprises a plurity of non-conducting plates 1121 fixed on the ring plate 112, a supporting bolt 1122 and spring 1123 is then screwed into the center of the ring plate 112.

The upper plate 12 has a convex annular shape, a thermal coil 1A is fixed on the top of the plate, and a through hole 1124 is located in the center of said plate 12 to allow the supporting bolt 1122 to go through and to be screwed by a nut 1125, whereby the upper plate 12 can be lifted due to the action of the supporting spring. Due to projecting damper 1126 desposed at the central ring part of lower ring plate 112, the upper plate 12 is allowed to shift laterally only within a limited distance.

The pan 2 is made with a concavity having an annular center and mutually adapted with thermal pot body to fit over plate 12. Furthermore, due to the function of the spring 1123, the upper plate 21 is always biased to tightly contact the top surface of the thermal coil 1A.

Figure 4:
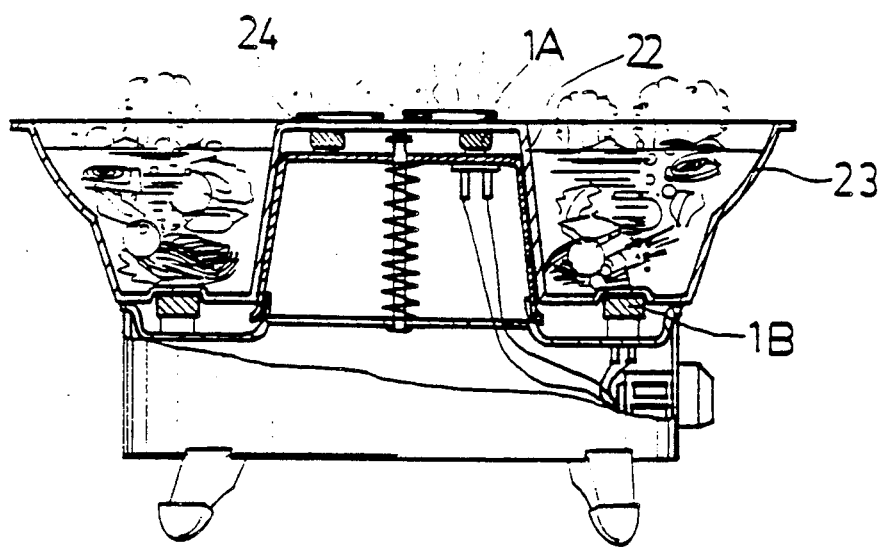
FIG. 4 shows the operational state of this invention.

Referring to FIG. 4, during use of the thermal chafing pot, the internal and external surfaces 22, and 23 respectively of the pan are highly heated due to the operation of coils 1A and 1B. Thus, foods within the ring area will be effectively heated providing power economy.

The top rim 24 of the pan can be used for grilling. This is also one of major features of this invention.

I claim:

1. An electric chafing pot having a base portion to provide heat and a pan for containing food detachable from said base portion, comprising:
    a lower heating plate formed on said base;
    a convex structure movably mounted in the center of said base;
    an upper heating plate formed atop said convex structure;
    said pan for containing food formed as a ring having a concavity formed in the middle of a bottom surface thereof to receive said convex structure of said base portion, said concavity having a top plate, said convex structure being biased by a spring support to tightly hold said top plate of said concavity to said upper heating plate enabling the pan to be supported by the upper and lower heating plates simultaneously.

2. The electric chafing pot of claim 1, wherein said base includes two heating coils, a first heating coil provided on said lower heating plate to provide heat for liquid-immersed cooking and a second coil provided on said upper heating plate for grilling.

3. The electric chafing pot as claimed in claim 1 further comprising a pan lid.

4. An electric chafing pot as claimed in claim 1 further comprising an annular damper at an intersection of said convex structure and a surface of said base unit to limit movement of said convex structure with respect to other portions of the base unit.

* * * * *